United States Patent [19]

Gerber et al.

[11] 4,131,224
[45] Dec. 26, 1978

[54] DETACHABLE INDEXING DEVICE AND METHOD

[75] Inventors: Heinz J. Gerber, West Hartford; David J. Logan, Glastonbury, both of Conn.

[73] Assignee: The Gerber Scientific Instrument Company, South Windsor, Conn.

[21] Appl. No.: 818,013

[22] Filed: Jul. 22, 1977

[51] Int. Cl.² ............................................. B65H 17/36
[52] U.S. Cl. ........................................ 226/8; 83/277; 226/161; 226/162; 346/136
[58] Field of Search ............... 226/8, 158, 159, 160, 226/161, 162, 163, 164, 165, 166, 167; 346/136; 83/277; 33/1 M

[56] References Cited

U.S. PATENT DOCUMENTS 3,844,461  10/1974  Robison et al. ..................... 226/8

Primary Examiner—Bruce H. Stoner, Jr.
Attorney, Agent, or Firm—McCormick, Paulding & Huber

[57] ABSTRACT

An apparatus having a table defining a work surface, and a carriage mounted for movement over the work surface in one direction includes a device for precisely indexing a strip of sheet material in the same direction so that various sections of the strip can be operated upon by an instrument mounted on the carriage. The indexing device comprises a bar that is parked at one edge of the work surface while the instrument and carriage are working on one section of the sheet material. The bar is subsequently attached to the carriage above the sheet material for an indexing operation. A plurality of magnets are mounted in the bar and cooperate with a clamping plate placed under the bar and the sheet material to clamp the sheet material between the plate and the bar during an indexing operation. After the indexing operation, the clamping plate and bar are returned to the parking position at one edge of the work surface and the bar is detached from the instrument carriage.

13 Claims, 6 Drawing Figures

DETACHABLE INDEXING DEVICE AND METHOD

BACKGROUND OF THE INVENTION

The present invention relates to a precise indexing apparatus and method for accurately shifting or moving sheet material over the work surface of a table. More particularly, the present invention is concerned with an indexing apparatus that can be attached and detached from a tool or instrument carriage between work operations.

U.S. Pat. No. 3,844,461 entitled "Precise Indexing Apparatus and Method" filed by H. J. Gerber and S. C. Robison discloses an apparatus that is used to shift sections of sheet material over the work surface of a plotting table in a numerically controlled plotting machine. A strip of plotting material having a length much greater than the dimensions of the work surface of the plotting table receives plotting information along its entire length by first plotting on one section of material positioned on the work surface, then shifting a new section of material onto the surface and continuing the plotting operation. The shifting and plotting operations may be repeated as often as desired or needed to complete a plot.

A significant advantage of the prior art apparatus in U.S. Pat. No. 3,844,461 is that the indexing of the sheet material is performed by the carriage which ordinarily carries the plotting instrument or tool that works on the sheet material. Thus the sheet material in indexed or moved with the same degree of accuracy as the instrument. Furthermore, by clamping the sheet material to the instrument carriage for indexing, the sheet material and the instrument have the same positional relationship before and after the indexing operation. Thus any fixed errors such as warpage of the ways or guides which hold the instrument carriage will not destroy the positional reference of the instrument and sheet material. Accordingly, continuity between the plot made prior to the indexing operation and the plot made after the indexing operation is maintained. For a more detailed explanation of the indexing operation and the utility of the apparatus reference is made to U.S. Pat. No. 3,844,461. In copending application Ser. No. 797,000 filed May 16, 1977, now U.S. Pat. No. 4,091,980, by H. J. Gerber and entitled "Apparatus for Advancing Sheet Material", a similar apparatus is disclosed.

In the prior art devices discussed above, couplings are fastened to the instrument carriage and move with the carriage during plotting or other work operations. Magnetic couplers such as shown in FIG. 10 of the referenced patent or the elongated bar in FIGS. 11 and 12 contribute to the inertia of a light-weight carriage and, correspondingly, depreciate the overall performance of the plotting apparatus. Furthermore, a friction coupler such as shown in the above-referenced application Ser. No. 797,000 cannot be utilized in systems where the work surface of the plotting table has a relatively high coefficient of friction or in instances where, for example, a sheet of carbon paper is positioned under the plotting material to generate duplicate copies of the plot or simply to improve the reproducibility of the plot.

Accordingly, it is a general object of the present invention to provide an indexing apparatus which constitutes an improvement by allowing light-weight carriages to operate at maximum performance and allows sheet material to be precisely indexed over work surfaces having high coefficients of friction or carbon paper coverings.

SUMMARY OF THE INVENTION

The present invention resides in a device and method for precisely indexing sheet material over the work surface of a table by means of the same carriage which moves an instrument that operates on the sheet material before and after an indexing operation.

The device which carries out the method includes a material indexing member that moves relative to the table in the same direction as the carriage. First actuatable coupling means associated with the indexing member couple sheet material on the support surface to the member before the material is shifted on the work surface and release the material afterward. Second actuatable coupling means associated with the indexing member and the carriage attach the member to the carriage for movement during the indexing operation and release the member therafter.

Accordingly, the sheet material is precisely indexed on the work surface of the table by the indexing member when the member is attached to the carriage. After the material has been moved and a new section of sheet material is placed on the work surface, the indexing member is released from the carriage, and the carriage without the added weight and inertia of the indexing member resumes the work operation of positioning an instrument or other tool mounted on the carriage at various locations over the new sections of material.

DESCRIPTION OF PREFERRED EMBODIMENTS

Figure 1:
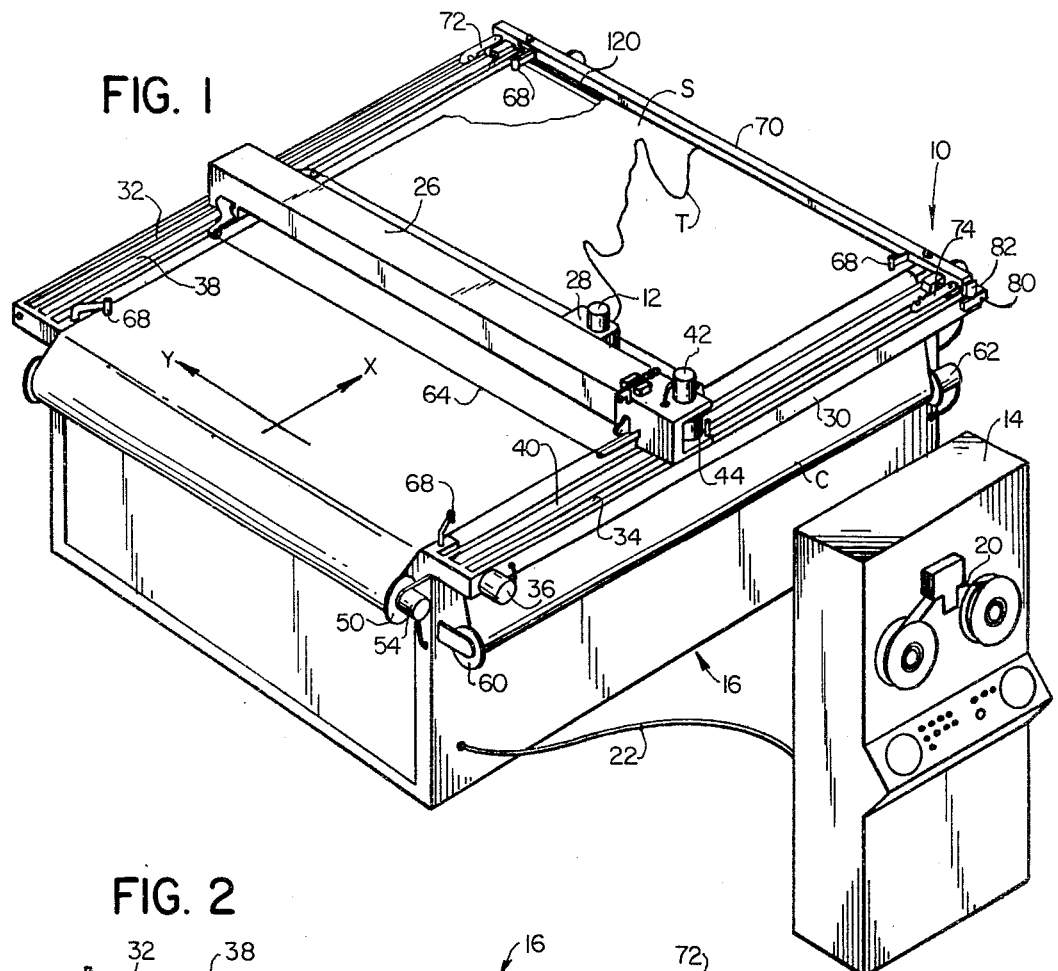
FIG. 1 is a perspective view of an automatically controlled plotter in which the present invention is embodied.

FIG. 1 shows an automatically controlled plotting system, generally designated 10, which provides a typical environment for the present invention. The plotting system includes a plotting instrument or head 12 which produces graphical information on a strip S of sheet material formed, for example, of plotting paper. Although a plotting system has been selected for illustration of the invention, it should be understood that the invention may be employed in and has utility in any type of automatically controlled system having an instrument or tool supported on a carriage for positioning over a strip of sheet material that is held stationary relative to the carriage during operation of the instrument. Thus, the invention may be employed in systems having tracking heads, cutting tools and numerous other instruments.

The numerically controlled plotting system is comprised basically of a controller 14 which generates plotting commands, and a flat bed plotting table 16 which responds to the commands and causes a plotting head 12 to draw graphic information on the strip S. The controller 14 reads a plotting program from a punched or magnetic tape 20 and converts the program into motor command signals that are transmitted to drive motors on the plotting table 16 by way of a connecting cable 22.

The plotting table 16 includes an X-carriage 26 which moves back and forth over the table in the illustrated X-coordinate direction and a Y-carriage 28 mounted on the X-carriage and movable relative to the X-carriage and the strip of plotting material in the illustrated Y-coordinate direction. Composite motions of the carriages 26 and 28 permit the plotting head 12 to be translated to any coordinate of the work surface on the bed 30 which supports one section of the strip of plotting material. The X-carriage 26 is accurately guided during motions in the X-direction by means of a round way 32 at one side of the table and by means of a flat way 34 at the opposite side. An X-drive motor 36 receives motor commands from the controller 14 through the cable 22, and drives a system of toothed pulleys and belts 38 and 40 connected to the X-carriage 26 at opposite sides of the plotting table 16 respectively. In this manner the X-carriage is translated in the X-coordinate direction to various positions over the table.

The X-carriage 26 spans or bridges the work surface of the plotting table and the Y-carriage is mounted and accurately guided on the bridging portion for movement above the table in the Y-coordinate direction. A Y-drive motor 42 receives motor command signals from the controller 14 through the cable 22 and drives another system of toothed pulleys and drive belts 44 connected with the Y-carriage 28. In this manner, the Y-carriage 28 is accurately positioned in the Y-coordinate direction along with the plotting head 12.

The plotting head 12 may contain a pen, light head or other plotting instrument which is actuated whenever a line trace T or other graphic image is to be placed on the strip S of plotting material. Operation of the plotting instrument is also regulated by the controller 14.

Figure 2:
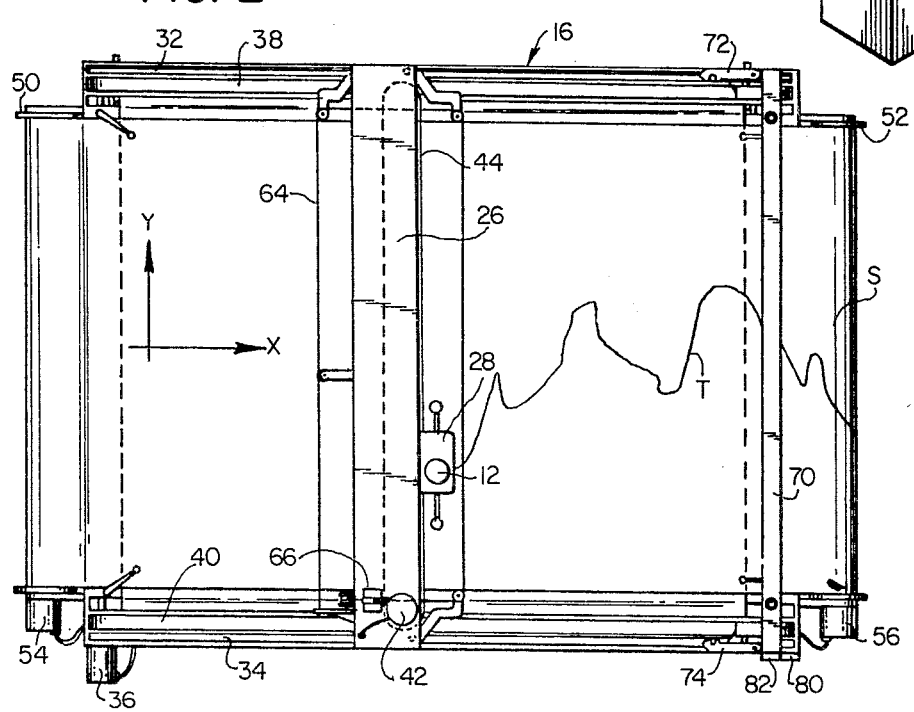
FIG. 2 is a top plan view of the plotting table shown in FIG. 1.

As shown in FIGS. 1 and 2, the strip S of plotting material is supported on rolls or feed spools 50 and 52 held respectively by brackets at opposite longitudinal ends of the table 16. A torque motor 54 is driveably connected with the spool 50 and another torque motor 56 is driveably connected with the spool 52 to hold a section of plotting paper taut on the work surface of the plotting table. If separate clamps are provided at each end of the table, the torque motors may be utilized to maintain predetermined amounts of paper in loops at one or both ends of the table so that the material can be freely indexed between the spools 50 and 52 when desired.

In order to produce duplicate copies of the information plotted on the strip S of sheet material, or in order to improve the image of the line trace T for photographic purposes, a strip of carbon or mimeographic material C may extend under the strip S of plotting material. As shown in FIG. 1 the strip C extends in the Y-coordinate direction transverse to the strip S and is mounted at one side of the table on a spool 60. The opposite end of the strip C is mounted on a corresponding spool (not visible) at the opposite side of the table so that the strip can be advanced periodically to place fresh carbon or mimeographic material under the strip S. A drive or torque motor 62 is provided for this purpose.

The pull cord 64, the switch 66 and the contacts 68 form a system for detecting the limits of travel of the carriages 26 and 28 and are the object of a copending application Ser. No. 818,212 filed July 22, 1977 by David J. Logan.

In accordance with the present invention a strip-engaging bar 70 extends across the plotting table 16 in the Y-coordinate direction parallel with the X-carriage 26. The bar is mounted on the round way 32 and flat way 34 for movement over the support surface of the table in the X-coordinate direction; however, separate ways may be provided for the carriage 26 and the bar 70 if desired.

Mounted at one end of the bar 70 is a releasable coupling 72 for attaching the bar to the corresponding end of the X-carriage 26. Mounted at the opposite end of the bar is another releasable coupling 74 for attaching the opposite end to the corresponding end of the carriage 26. When the bar 70 is attached to the carriage and the strip S of plotting material is engaged by the bar, the strip can be indexed relative to the work surface of the plotting table in the same manner as in the prior art apparatus discussed above. Thus, a new section of the plotting material is shifted onto the work surface of the table by means of the X-carriage 26, and the strip is positioned with the same degree of accuracy as the plotting head. There is little or no change of relative position between the plotting head and the strip during the indexing operation.

After the strip S has been indexed, the bar 70 may be returned to the parking position illustrated in FIGS. 1 and 2. The strip and bar are released from the X-carriage 26 so that the carriage can resume a plotting operation without being impeded by the additional weight of the bar 70 and couplings 72 and 74. Thus, a high performance plotter can incorporate the indexing equipment without suffering any depreciation in performance due to the added weight and inertia of a strip-engaging member.

In one mode of operation the bar 70 is located in a parking position at one extremity of the work surface of the plotting table 16 as shown in FIGS. 1 and 2. A position detent 80 mounted on the bed 30 of the table is contacted by a cam 82 on the bar to provide a signal to the controller 14 which indicates that the bar is in its parking position and prepared to be picked up by the X-carriage 26. The carriage 26 is then slewed to the position shown in FIG. 3 for engagement by the couplings 72 and 74. The bar 70 is then moved with the carriage 26 to the opposite or remote edge of the work surface where the strip of sheet material is engaged by the bar. The carriage 26 and the bar are then slewed with the strip of sheet material in tow until the bar 70 is returned to the parking position. The torque motors 54 and 56 may be energized to assist the carriage in shifting a new segment of plotting material onto the work surface of the table from the spool 50 while the old section containing a plot is wound onto the spool 52. Once the new section is in position on the plotting table, the material is disengaged from the bar 70 and the bar is detached from the carriage 26. Thus, the carriage and the plotting head 12 are prepared to resume the plotting operation without hinderance by the bar 70 and couplings 72 and 74.

Of course, it will be understood that the indexing operation can be carried out in different manners. For example, the bar 70 can be engaged with the strip S of plotting material before the bar is removed from the parking position by the carriage 26. In this event the strip is indexed from the spool 52 toward the spool 50. When the new section of plotting material is on the work surface of the table, the material is disengaged from the bar, and the carriage returns the bar to the parking position without the strip in tow. It is preferable that the bar be returned to the parking position regardless of how the indexing operation is accomplished so that the work surface of the table is not obstructed by the bar during a plotting operation.

One embodiment of the strip-engaging bar 70 and the couplings 72 and 74 is detailed in FIGS. 3-6. In this embodiment the couplings 72 and 74 are solenoid-actuated couplings, each having the same general construction and mounted at one end of the bar.

The coupling 74 is comprised of a pivotal latch arm 90 and an electrically actuated solenoid 92 mounted on a platform 98 at the end of the bar. The solenoid armature is connected to the latch arm and pulls the arm from the phantom position to the solid line position when the solenoid is actuated. A return spring 94 connected between the bar 70 and one end of the latch arm 90 biases the arm to the phantom position in opposition to actuation by the solenoid.

A latch pin 96 is mounted in the X-carriage 26 to be engaged by the forked end of the latch arm 90 when the solenoid 92 is actuated. When the forked end of the arm is engaged with the pin 96, the strip engaging bar 70 is firmly attached for movement with the X-carriage 26 over the work surface of the table 16. Whenever the solenoid 92 is deactuated, the return spring 94 rotates the latch arm to the phantom position so that the latch arm is disengaged from the pin 96 and the bar is disconnected from the X-carriage at the one end.

The coupling 72 has basically the same construction as the coupling 74 and operates in substantially the same manner. A latch arm 100 is pivotally mounted on the arm and is pulled into engagement with a latch pin 106 on the carriage 26 by means of a solenoid 102. When the solenoid is deactuated, a return spring 104 disengages the arm from the pin.

Figure 3:
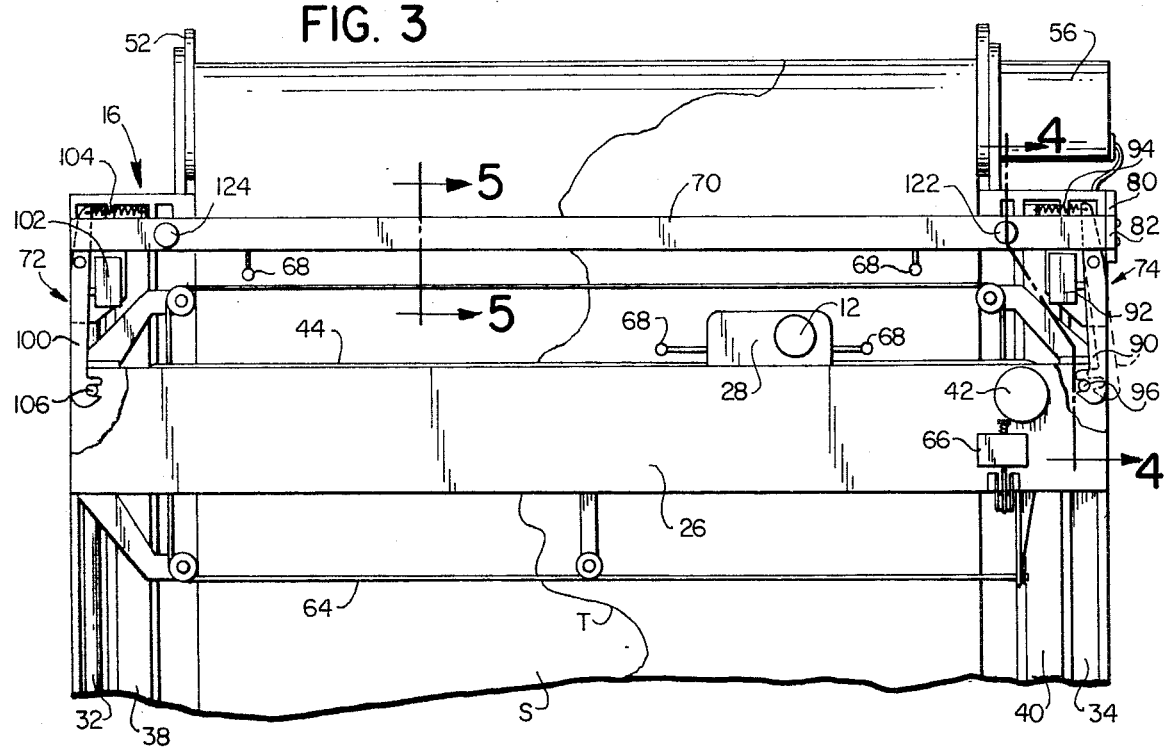
FIG. 3 is a fragmentary plan view of the plotting table at one end and shows the X-carriage in position for coupling the strip-engaging bar to the carriage.

When the X-carriage is in the pick up position illustrated in FIG. 3, the solenoids 92 and 102 are simultaneously actuated and both of the latch arms 90 and 100 engage the pins 96 and 106 respectively on the X-carriage. The bar 70 is then coupled to the carriage for movement back and forth over the work surface of the plotting table 16 during an indexing function. To insure proper operation of the indexing arm and to eliminate the possibility of damage, it is desirable to include in the ends of the latch arms safety switches which establish that both of the latch pins 96 and 106 are engaged before the X-carriage starts to move.

Figure 5:
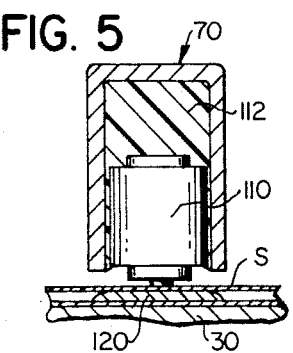
FIG. 5 is a fragmentary cross-sectional view of the plotting table and strip-engaging bar as seen along the sectioning line 5—5 in FIG. 3.
Figure 6:
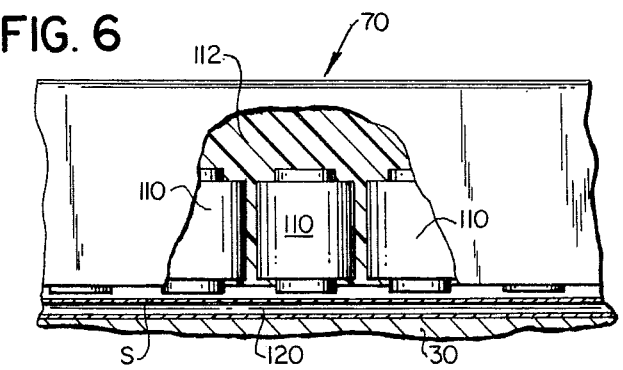
FIG. 6 is a fragmentary view of the strip-engaging bar above the plotting table.

The manner in which the bar 70 engages the strip of sheet material during an indexing operation can take various forms. In the illustrated embodiment, the bar is constructed with a plurality of electromagnets 110 located serially along the length of the bar as shown in the fragmentary sectional views of the bar in FIGS. 5 and 6. The magnets 110 are interconnected for simultaneous energization and de-energization, and are fixedly mounted within the channel of the bar 70 by means of a potting compound 112. Since most sheet materials that are indexed are not ferromagnetic, and thus are not inherently responsive to the magnets 110, a ferromagnetic clamping plate 120 cooperates with the magnets and is positioned under the bar 70 and under the sheet material S on the work surface as shown in FIGS. 5 and 6. The plate 120 is relatively thin and has a thickness selected to provide a space between the bar and plate sufficient to loosely accommodate the strip or strips of sheet material and permit the strips to slip or move through the space. It is also desireable that the clamping plate be coated with a low friction material such as polytetraflouroethylene in order to allow the plate to slide easily between the sheet material and the table bed 30.

When the magnets 110 are energized, the clamping plate is pulled upwardly off of the work surface of the bed 30 and clamps the sheet material firmly to the bar 70. The material is thus firmly coupled to the bar, and with the bar attached to the carriage, the sheet material is indexed over the work surface as the carriage is translated.

Figure 4:
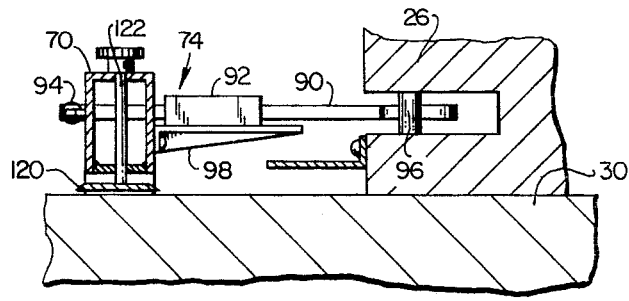
FIG. 4 is a fragmentary cross-sectional view of the carriage and strip-engaging bar as seen along the section line 4—4 in FIG. 3 and shows details of a coupling.

After the sheet material has been indexed the electromagnets 110 are de-energized and the clamping plate 120 is magnetically released from the bar so that the sheet material is uncoupled. The bar 70 and the clamping plate 120, however, remain mechanically coupled by way of lock pins 122 and 124. The lock pin 122 extends downwardly toward the table bed through the one end of the bar and the clamping plate 120 as shown in FIG. 4. In a similar manner, the lock pin 124 extends through the opposite end of the bar and the clamping plate. The lock pins are loosely received in either the bar or the plate so that the plate can move vertically toward and away from the bar when the electromagnets are energized and de-energized respectively. The pins 122 and 124 allow the bar and plate to be translated relative to the strip of sheet material without clamping the material. Such movement is essential in order to move the bar between the parking position and a remote position where the strip of sheet material is coupled or decoupled from the bar. The lock pins 122 and 124 also can be removed so that the clamping plate can be withdrawn and periodically cleaned. It will be understood that when carbon or mimeographic paper is positioned under the strip of sheet material for reproduction purposes, the plate 120 serves the function of stripping the sheet material from the underlying paper.

In summary, an improved indexing apparatus has been disclosed in which an indexing bar 70 is provided with couplings 72 and 74 that allow the bar to be engaged with the X-carriage 26 only when an indexing operation is to be performed. At other times while the carriage is moving the plotting head 12 in a plotting operation, the bar and couplings remain parked at one end of the work surface and do not impede high speed motions or accelerations of the carriage. Thus, the overall performance of the plotter is not depreciated, but the indexing function is made possible.

While the present invention has been described in a preferred embodiment it will be understood that numerous modifications and substitutions can be made without departing from the spirit of the invention. For example, it is not necessary to use a ferromagnetic clamping plate 120 to shift sheet material that has inherent or artificially generated ferromagnetic characteristics. Furthermore, the strip-engaging bar may utilize vacuum cups or have a construction such as shown in FIGS. 11 and 12 of U.S. Pat. No. 3,844,461 so that the use of magnets and ferromagnetic materials is not essential. The latch mechanisms for attaching the strip-engaging bar to the X-carriage 26 can also take other forms. Accordingly, the present invention has been described in a preferred embodiment by way of illustration rather than limitation.

I claim:

1. In combination in an apparatus having a table defining a support surface extending in two coordinate directions and on which sheet material is spread while a carriage spanning the table in one of the coordinate directions and suitable for accurately positioning an instrument which works on the material is controllably movable in the other of the coordinate directions back and forth over the table parallel to the work surface and relative to the sheet material, the improvement comprising: a material indexing member also movable relative to the table in said other of the coordinate directions; first actuatable coupling means associated with the indexing member for releasing and attaching sheet material on the support surface to the member; and second actuable coupling means associated with the indexing member and the carriage for releasing and attaching the member to the carriage for movement relative to the table, so that the sheet material can be precisely indexed on the work surface of the table by the indexing member when said member is attached to the carriage, and the indexing member can be released from the carriage while the instrument on the carriage works on the material.

2. In combination, the improvement of claim 1 wherein the indexing member is a bar extending parallel to the carriage spanning the table; and the first actuatable coupling means comprises means for releasably attaching the sheet material on the table to the bar along the length of the bar.

3. In combination, the improvement of claim 2 wherein the first actuatable coupling means comprises magnetic coupling means.

4. In combination, the improvement of claim 2 wherein the first actuatable coupling means comprises a plurality of electromagnets mounted along the bar, and an elongated clamping plate coextensive with the magnets and made from a ferromagnetic material to be attracted to the magnets for clamping sheet material against the bar.

5. In combination, the improvement of claim 4 wherein the bar and electromagnets are mounted above the work surface of the table, and the elongated plate has a thickness selected to provide a space between the magnets and the plate resting on the work surface sufficient to loosely accommodate the sheet material.

6. In combination, the improvement of claim 4 wherein the elongated clamping plate and the bar span the work surface of the table in said one coordinate direction and the opposite ends of the elongated plate are mechanically attached to the bar to allow limited movement of the plate toward and away from the bar.

7. A method of precisely indexing a strip of sheet material over the work surface of a table in one coordinate direction by means of a carriage which carries an instrument and traverses the work surface in said direction from one end to an opposite end with accuracy sufficient to position the instrument for operation at different points of the material on the work surface comprising:

locating a strip-engaging member in a parking position at one end of the work surface while the carriage is positioning the instrument in an operation over the sheet material on the work surface;

after the operation over the sheet material on the work surface, positioning the carriage at said one end of the work surface where the engaging member is in the parking position;

attaching the engaging member to the carriage for traversing movement over the work surface with the carriage;

coupling the strip of sheet material to the carriage by means of the strip-engaging member; and indexing the coupling strip over the work surface of the table by moving the carriage and attached engaging member.

8. A method of precisely indexing a strip of sheet material as defined in claim 7 including the step of uncoupling the strip of sheet material from the strip-engaging member after the step of indexing.

9. A method of precisely indexing a strip of sheet material as defined in claim 8 further including the steps of returning the strip-engaging member to the parking position, detaching the strip-engaging member from the carriage; and then positioning the instrument by means of the carriage in a further operation on the sheet material on the work surface.

10. A method of precisely indexing as defined in claim 9 wherein the step of returning the strip-engaging member is performed after the step of uncoupling the strip.

11. A method of precisely indexing as defined in claim 9 wherein the step of coupling the strip to the carriage is performed at a position on the work surface of the table remote from the parking position and includes the step of moving the strip-engaging member from the parking position to the remote position before the step of coupling; and the step of returning the strip-engaging member is performed simultaneously with the step of indexing the strip of sheet material.

12. A method of precisely indexing a strip of sheet material as defined in claim 7 wherein the strip-engaging member comprises an elongated clamping member; and the step of locating comprises locating the clamping member in the parking position under the strip of sheet material, and the step of coupling comprises clamping the strip to the carriage by means of the clamping member.

13. A method as in claim 12 wherein the clamping member is magnetically actuated.

* * * * *

UNITED STATES PATENT OFFICE
CERTIFICATE OF CORRECTION

Patent No. 4,131,224          Dated December 26, 1978

Inventor(s) Heinz J. Gerber and David J. Logan

It is certified that error appears in the above-identified patent and that said Letters Patent are hereby corrected as shown below:

Col. 2, line 21, "therafter" should be --thereafter--.

Col. 8, line 20, "coupling" should be --coupled--.

Signed and Sealed this

Tenth Day of April 1979

[SEAL]

Attest:

RUTH C. MASON
Attesting Officer

DONALD W. BANNER
Commissioner of Patents and Trademarks